United States Patent [19]
Niemi

[11] 4,152,752
[45] May 1, 1979

[54] ILLUMINATION SYSTEM AND APPARATUS THEREFOR

[76] Inventor: Gary A. Niemi, 901 Mossvine Dr., Plano, Tex. 75023

[21] Appl. No.: 830,570

[22] Filed: Sep. 6, 1977

[51] Int. Cl.² .............................................. F21V 7/04
[52] U.S. Cl. ..................................... 362/32; 362/145; 362/147; 362/209; 362/251; 362/266
[58] Field of Search ................. 362/32, 209, 251, 145, 362/147, 266

[56] References Cited
U.S. PATENT DOCUMENTS
3,532,873  10/1970  Batson et al. .......................... 362/32

Primary Examiner—Stephen J. Lechert, Jr.
Attorney, Agent, or Firm—Kenneth R. Glaser

[57] ABSTRACT

Disclosed is an illumination system incorporating light pipes distributing light to large numbers of building spacial units, the system employing artificial or natural light sources, light splitters, optical switches, and light fixtures or lamps. Alternate embodiments of light splitters and optical switches are also disclosed as well as a specific type light fixture employing reflector cones, lenses, and a pyramid shaped reflector.

11 Claims, 12 Drawing Figures

U.S. Patent   May 1, 1979   Sheet 1 of 3   4,152,752
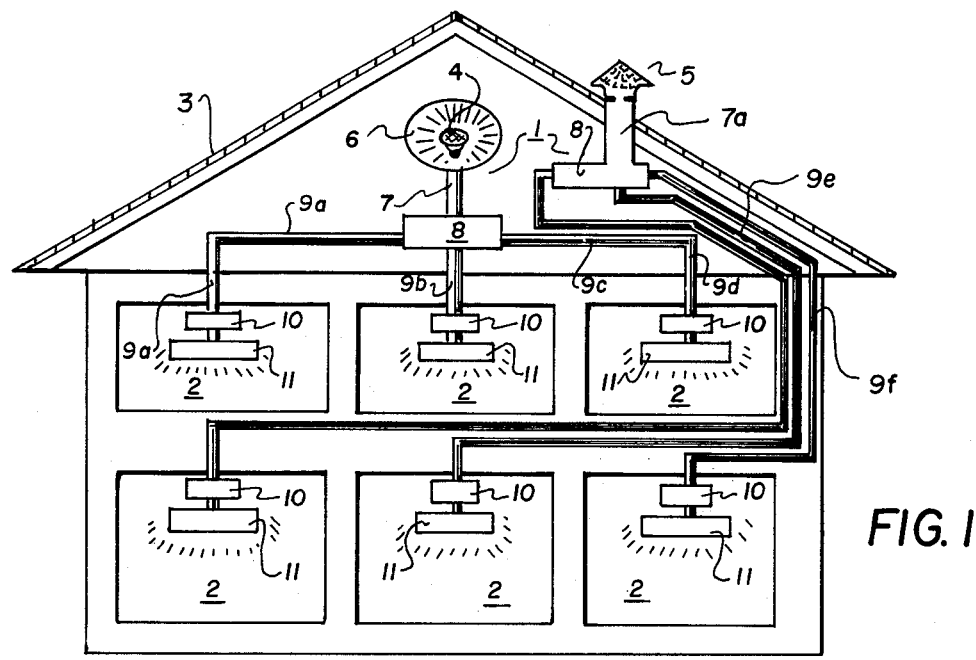
FIG. 1
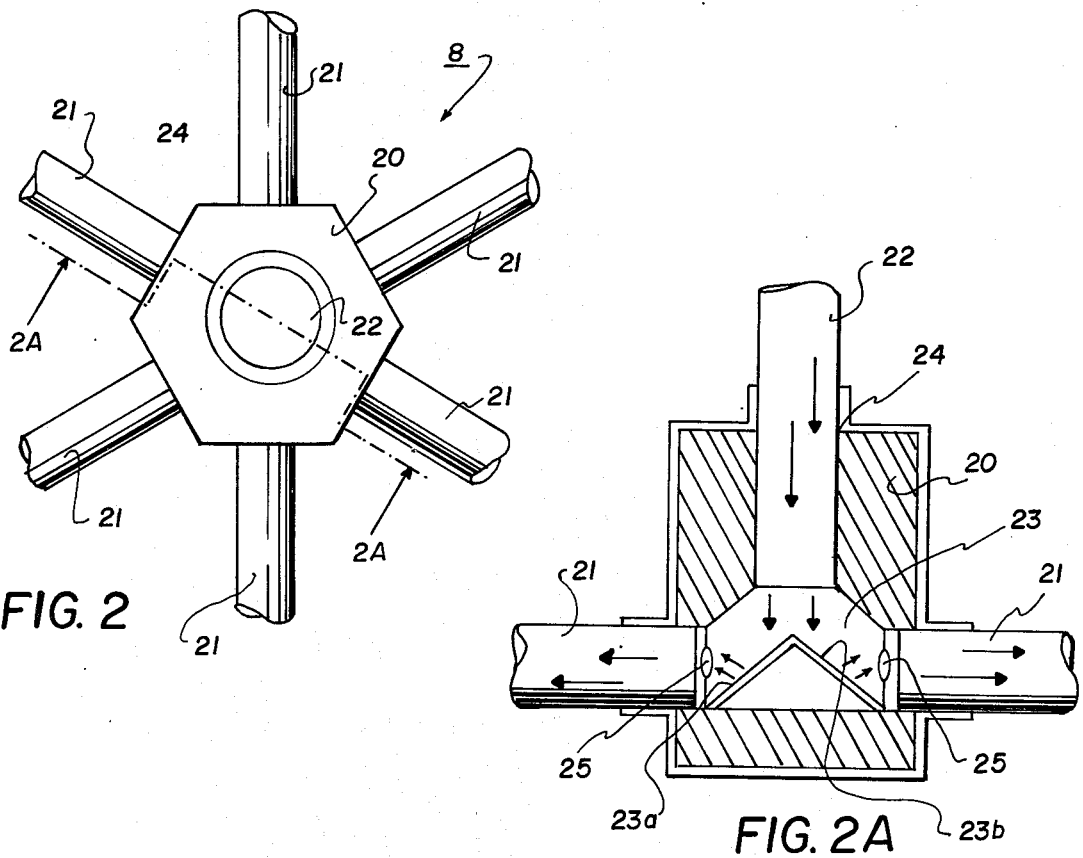
FIG. 2
FIG. 2A

ILLUMINATION SYSTEM AND APPARATUS THEREFOR

The present invention relates to illumination systems, more particularly to illumination systems employing light pipes for distribution of artificial or natural light to spacial units of a building, and even more particularly to light splitters, light fixtures, and optical switches utilized in such systems.

Ever increasing energy costs continue to emphasize the need for more effective and efficient illumination systems which provide the requisite lighting, but without resulting in a corresponding high utilization of energy. Traditionally, lighting for various rooms and spacial units in buildings, such as residential dwellings, factories, hospitals and the like, have employed individual lamps or lighting fixtures, the operation of which requiring a relatively high quantum of energy. As a consequence, it is imperative that alternative illumination systems be developed which reduce the total amount of energy consumed, as well as providing a sufficient level of light within the area to be illuminated.

Recent developments in the field of illumination, and particularly in the field of fiber optics, have suggested the possibility of transmitting light from a single energy source along light pipes or guides, which thus channel the light to the area or areas to be illuminated. To date, however, apparatus embodying this concept have been limited to either decorative lamps or to equipment for the illumination of single areas. Thus, developments to date have failed to recognize the full potential of an illumination system such as the type forming the present invention for illuminating large numbers of spacial units within large buildings or the like. Furthermore, existing apparatus and equipment do not include effective and efficient means for splitting or redistributing light from a single source to the areas to be illuminated, for radiating the light within the particular rooms or spacial units to be illuminated from lamps or similar light fixtures, nor for effectively switching, by optical means, the light transmitted to such light fixtures.

It is therefore a principal object of the present invention to provide a new and improved illumination system.

It is another object of the present invention to provide an improved illumination system, incorporating light pipes, for effectively and efficiently illuminating large numbers of adjacently disposed spacial units of a building or the like.

It is a still further object of the invention to provide new and improved light splitters, light fixtures, and optical switches of the type having particular usefulness in an overall illumination system incorporating fiber optics or similar light guides.

These and other objects of the invention, as well as specific features and advantages thereof, will become readily understood and appreciated from the following detailed description, taken in conjunction with the accompanying drawings, in which:

FIG. 1 is a diagrammatic representation of a total illumination system in accordance with the principles of the present invention;

FIG. 2 is a pictorial view of one preferred embodiment of a light splitter of the type employed in the system depicted in FIG. 1;

FIG. 2A is a cross-sectional view of the light splitter depicted in FIG. 2 taken along the section line 2A—2A;

Figure 3:
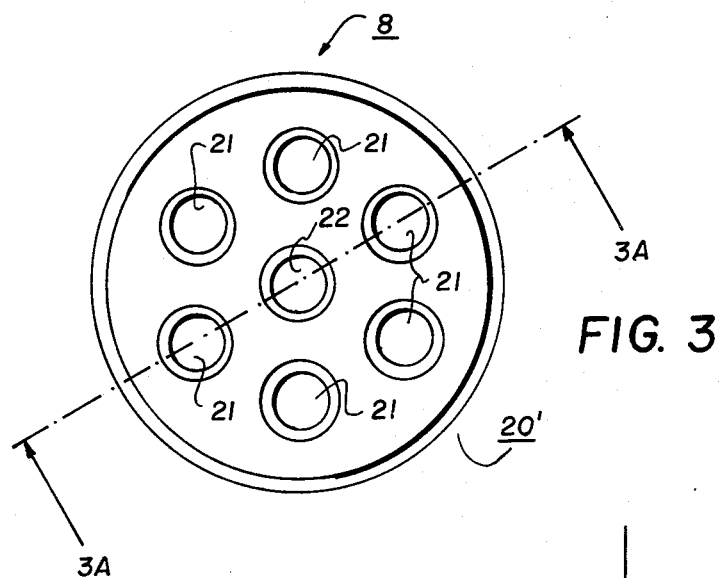
FIG. 3 is a top view of an alternative embodiment of a light splitter.

The drawings are not necessarily to scale and in some instances, portions have been exaggerated in order to emphasize particular features of the inventions.

Referring initially to FIG. 1, an illumination system for furnishing light to individual spacial units 2 of a building 3, and constructed in accordance with the principles of the present invention, is broadly depicted by the reference numeral 1. In accordance with the broad application of the invention, the building 3 may be any type of edifice, such as a factory, hospital, home, etc.; and the individual spacial units 2 may be any dimensional area, or portion thereof, which is to be illuminated. Solely for purpose of an illustrative example of one such application, FIG. 1 depicts the building 3 as a residential dwelling and the spacial units 2 as individual rooms of such dwelling.

The system 1 furnishes the required illumination from a light source which, in accordance with alternative choices, may be an artificial light source 4, such as a high intensity lamp, as a mercury vapor light or the like; or, directly from sunlight received by a conventional solar collector 5 mounted exterior of the building 3. For purpose of illustration, FIG. 1 depicts the illumination system 1 as transmitting light from both an artifical and natural (sunlight) light source; although it is believed apparent that the system could include either, if not both, of these sources.

The artificial light source 4 is normally disposed within a housing 6 having suitable reflecting means, as for example a parabolic reflector, for directing high intensity light beams through a light pipe or guide 7 to light distribution or splitter means 8. The light source may be powered from a conventional AC source or, alternatively, by solar energy derived from solar batteries and/or related solar energy collector apparatus mounted exterior of the building 3.

The splitter 8, the details of which are subsequently described, is effective to redirect the light beams through output light pipes 9a, 9b, and 9c respectively defining branch illumination paths to the corresponding rooms 2 to be illuminated. Light within each of the guide 9a, 9b, and 9c then passes, by way of optical switches 10, to light fixtures 11 for effective radiation of the light throughout the particular spacial unit. Light fixtures as used herein mean and refer to any type of lighting apparatus, such as table lamps, floor lamps, hanging lamps, or the like having the objective of radiating light throughout a spacial unit, or part thereof.

In similar manner, sunlight received by the solar collector/concentrator 5 is directed through light pipe 7a to light splitter 8, where it is redistributed by way of output light pipes 9d, 9e, 9f, to the light fixtures 11 (by way of optical switches 10).

While FIG. 1 depicts the light splitters 8 as being in direct optical communication with, and redistributing light received directly from, the sources 4 or 5; this is only an illustrative example and it may also be desirable to utilize a light splitter at other locations within the light distribution network. For example, a splitter 8 may be disposed immediately adjacent one of the spacial units 2 with the light pipe thereof (for example 9a) forming the input to the splitter and the output light pipes therefrom extending to other spacial units (not pictured) in the building 3.

The light pipes or guides 7, 7a, and 9a-9e can be of the type presently known in the art and which are traditionally fabricated from light conducting or fiber optics materials and which are effective to direct the light as one or more collimated beams therethrough. These light pipes, which of themselves do not form a part of the present invention, can be formed to any desired shape, and may include integrally formed reflector elements, in order to substantially confine and direct the light along the desired paths. As indicated in FIG. 1, these light pipes may be installed, for example, to extend through the attic or adjacent to the exterior walls of the building for entry (through a socket, for example) into the particular room being illuminated at convenient locations thereof.

As previously discussed, each of the light splitters 8 is effective to distribute the light beams from the particular source along the respective illumination paths extending to the respective spacial units to be illuminated. While each of these splitters may be of various designs accomplishing this objective, a light splitter in accordance with one preferred embodiment of the invention is depicted in FIGS. 2 and 2A. Accordingly, the splitter 8 comprises a housing 20 formed by a multisided prism with the light pipes defining the output light distribution channels (and designated in FIGS. 2 and 2A by the reference numerals 21) radially extending through the respective sides of the housing; and the light pipe defining the input channel which would be in optical communication with the light source (depicted by the reference numeral 22) extending into the housing 20 normal to the axes of the pipes 21. It is to be understood that while FIG. 2 depicts the housing 20 as an eight-sided prism (thus providing distribution of light to eight spacial units), this is only an illustrative example and the housing may be of any number of sides (in excess of one) depending upon the number of spacial units to be illuminated.

The respective ends of the input pipe 22 and the output pipes 21 are in optical communication with a central cavity 23 of the splitter housing 20, the interior walls of the cavity either being formed of a reflective material or having reflective surfaces or mirrors disposed immediately adjacent to such walls. More specifically, and as depicted in FIG. 2A, reflective surfaces 23a and 23b opposite the entrance port 24 (through which the light pipe 22 extends) are angularly disposed to direct light beams entering through light pipe 22 toward the ends of the output pipes 21. Additionally, suitable lenses 25 are mounted adjacent to the ends of the pipes 21 to collimate the light beams passing out of the housing through the guides 21.

Figure 3A:
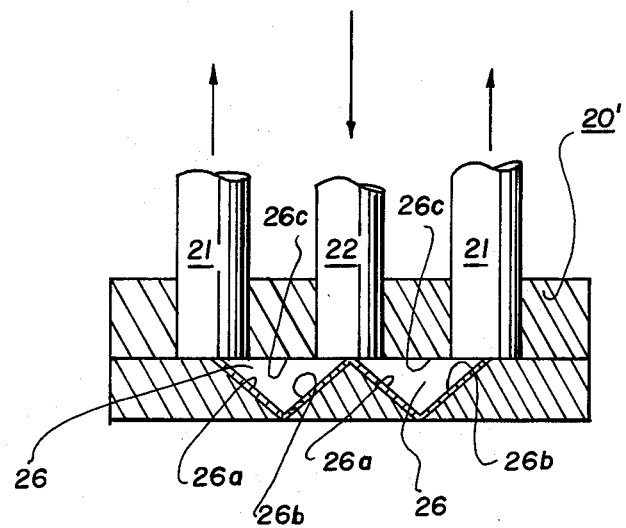
FIG. 3A is a cross-sectional view of the light splitter depicted in FIG. 3 taken along the section line 3A—3A.

An alternate embodiment of the light splitters 8 is depicted in FIGS. 3 and 3A. Accordingly, the splitter housing (here designated by the reference numeral 20') is of a circular configuration with the input light pipe 22 and output light pipes 21 extending parallel to one another into the housing 20'. As depicted in FIGS. 3 and 3A, the output light guides 21 are circumferentially disposed around the input pipe 22 and are in optical communication with the guide 22 by way of cavities 26 formed in the housing and defined by interior wall portions 26a, 26b, and 26c, such wall portions being of light reflective material. The walls 26a and 26b are angularly disposed with respect to one another to direct light beams entering input pipe 22 out and through exit light pipes 21.

Figure 4:
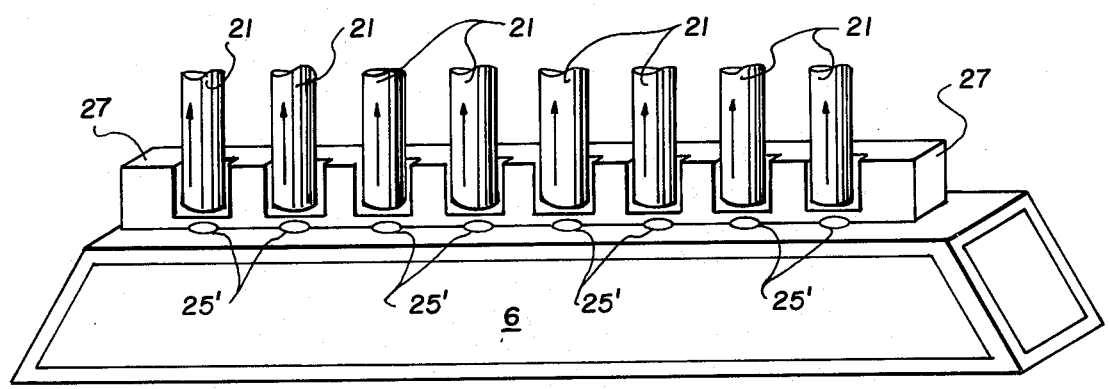
FIG. 4 is a pictorial view of another alternative embodiment of a light splitter.

Another alternate embodiment of a light splitter of the invention is depicted in FIG. 4. Accordingly, in this embodiment, a housing 27 for retaining the output light guides 21 in parallel to one another is mounted immediately adjacent the light source (not shown) within a housing 6 so that light emanating from the source is directed (by way of lenses 25') through the output channels 21 to the respective spacial units to be illuminated.

Figure 5:
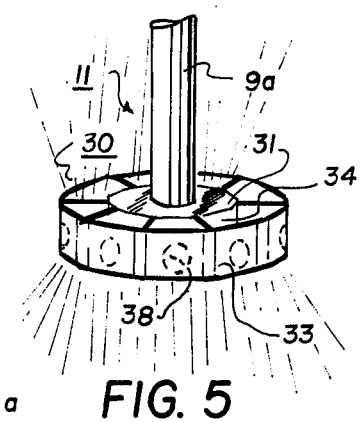
FIGS. 5 and 6 are pictorial views of a preferred form of light fixture for incorporation with the system depicted in FIG. 1 with the top wall of the fixture removed in FIG. 6 for convenience of illustration.
Figure 6:
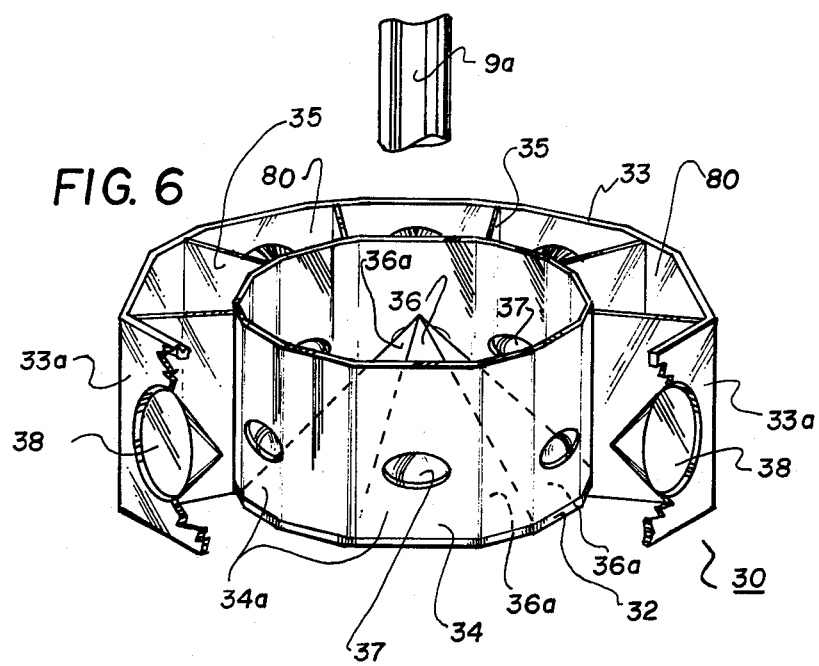
Figure 7:
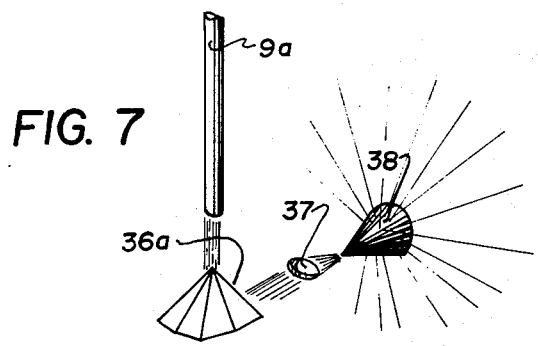
FIG. 7 is a schematic representation depicting the operation of the fixture depicted in FIGS. 5 and 6.

Referring now to FIGS. 5-7, a preferred embodiment of a light fixture 11 (FIG. 1) effective to receive the collimated light from the incoming light guide (for example 9a) and disperse this light around the fixture for illumination of the particular room or spacial unit 2 is now described. Accordingly, and with initial reference to FIGS. 5 and 6, the light fixture 11 comprises a generally annular shaped body 30 comprising an outer circumferentially extending, multi-segment side wall 33 and an inner multi-segment side wall 34 concentric with, and spaced from, the outer wall 33. The outer and inner walls 33 and 34 have the same corresponding number of respective wall segments 33a and 34a, facing one another; and are joined by radially extending struts 35 extending therebetween. The fixture 11 further includes centrally disposed top and bottom walls 31 and 32 respectively radially extending to a location aligned with the inner side wall 34, thus defining an annular channel 80 extending between inner and outer walls 34 and 33. The walls 31-33 and struts 35 are preferably formed of a transparent plastic material of lightweight construction; and the inner wall 34, also of plastic, is preferably opaque.

Centrally disposed upon the base 32 is a generally pyramid shaped body 36, which surfaces 36a are of light reflecting material. The surfaces 36a are so oriented with respect to the inner wall 34 (and particularly with respect to segments 34a) to reflect light impinging upon the body 36 toward the segments 34a and particularly upon a set of lenses 37 respectively disposed within, and extending through, the inner wall segments 34a.

Respectively associated with the outer wall segments 33a are light cones 38 of reflective material and having their axes normal to the outer and inner wall segments 33a and 34a, the bases of these cones respectively affixed to the inner surface of wall segments 33a, and the apex of each cone disposed at the focal point of a corresponding lens 37. Each of the cones 38 is effective to reflect light impinging on its outer surface (by way of lens 37 as well as from adjacent cones) for radiation essentially 360° around the cone, through the channel 80, and therefore surrounding the light fixture (as shown in FIG. 5).

The incoming light guide (for example 9a) extends through a central opening in the top wall 31 to a location immediately adjacent the apex of the pyramid shaped body 36. Thus, light beams emanating from the end of the light pipe 9a will be reflected by the sides 36a toward the lenses 37, the reflected light thereby being focused by the lenses 37 upon, and reflectively dispersed by the light cones 38. This function is diagrammatically represented in FIG. 7 depicting one set of cooperating elements (side 36a lens 37, cone 38).

The light fixture depicted in FIGS. 5 and 6, with minor modifications, can also be utilized as a light splitter 8. Accordingly, by replacing the reflective light cones with output light pipes (for example, light guides 9a, 9b and 9c) which extend through the wall segments 33a to a location immediate adjacent the lenses 37, incoming light (from light guide 7, for example) can be re-channeled through the output pipes. Thus, essentially the same structure depicted in FIGS. 5 and 6 can be utilized in the construction of both light fixtures and light splitters, thereby minimizing the fabrication cost of the total system 1.

Figure 8:
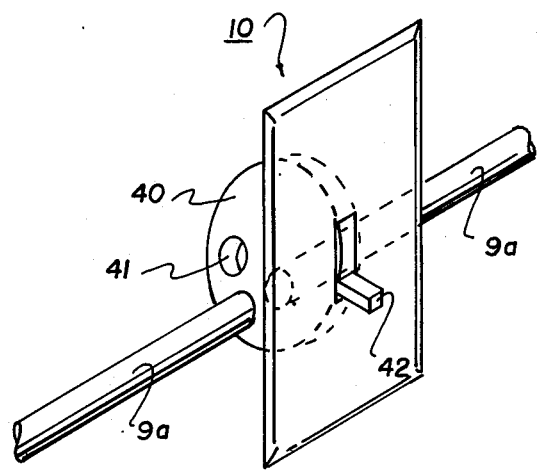
FIGS. 8–10 are pictorial views of alternative embodiments of optical switches for incorporation with the system depicted in FIG. 1.

With reference again to FIG. 1, it is noted that optical switches 10 are disposed within the light channels (for example, channel 9a) extending to the particular light fixture 11 in the room 2. A preferred form of such switch is depicted in FIG. 8 and includes an opaque disc 40 disposed intermediate segments of light pipe 9a. The disc 40 has an opening or transparent portion 41 adapted to be rotated into and out of alignment with the respective segments of the light pipe 9a, thus turning the switch "on" and "off", respectively. The rotation of the disc 40 between its light blocking (or "off") position depicted in FIG. 8 and its non-blocking (or "on") position to enable light to pass to the fixture 11 can be effected by respectively lowering and raising the switch lever 42.

Figure 9:
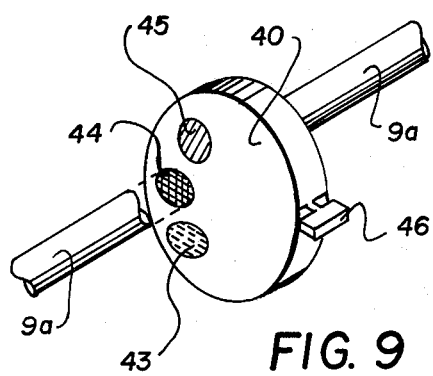

A modification of the optical switch 10 is depicted in FIG. 9 where, in lieu of just one transparent opening 41, the opaque disc 40 is provided with a plurality light transparent portions 43, 44, and 45 each of said portions being provided with materials or filters of a different color (for example, blue, green, and red). Thus, by rotating the disc 40 by the lever 46 to position the respective portions 43, 44 and 45 within the gap between segments 9a, light emanating from the fixture 11 can be of varying colors.

Figure 10:
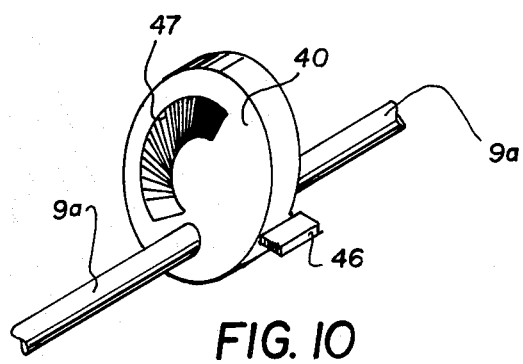

A further modification of the optical switch is depicted in FIG. 10 wherein the opaque disc 40 has an arcuate slot 47 having means disposed therein of varying the degrees of transparency. Thus by rotating the disc 40 to progressively advance the slot between its highly transparent to nearly opaque position, a dimmer switch is effectively provided for the light fixture 11.

Various modifications to the disclosed embodiments, as well as alternate embodiments, may become apparent to one skilled in the art without departing from the spirit and scope of the invention as defined by the appended claims.

What is claimed is:

1. In combination, a building having a plurality of spacial units and a system for the illumination of said plurality of spacial units, said system comprising:
   (a) a light source, disposed at a location remote from said spacial units,
   (b) a plurality of light fixtures respectively located within said spacial units, said light fixtures dispersing light received thereby throughout said spacial units,
   (c) light splitter means in optical communication with said light source for distributing light from said source along respective light paths extending to each of said light fixtures,
   (d) each of said light paths defined by light pipes in respective optical communication with said light splitter means and said light fixtures, and
   (e) a plurality of optical switches respectively disposed in said light paths between said light splitter means and said light fixtures for alternately enabling and interrupting the passage of light to said light fixtures.

2. The system as defined by claim 1 wherein said light source is an artifical light of high intensity.

3. The system as defined by claim 1 wherein said light source is a solar collector adapted to receive sunlight.

4. The system as defined by claim 1 wherein said light splitter means comprises:
   (a) a housing defining a central cavity therein,
   (b) means retaining said light pipes in optical communication with, and radially extending from, said central cavity,
   (c) means directing light from said source into said cavity, and
   (d) reflector means associated with said cavity for directing light within said cavity toward said light pipes.

5. The system as defined by claim 1 wherein said light splitter means comprises:
   (a) a housing,
   (b) first means directing light from said source into said housing,
   (c) second means retaining said light pipes around, and parallel to, said first means, and
   (d) reflector means within said housing redirecting light from said first means into said light pipes.

6. The system as defined by claim 1 wherein said light splitter means comprises:
   (a) a housing for retention of said light source,
   (b) means retaining said light pipes parallel to one another and in optical communication with said light source, and
   (c) a plurality of lenses intermediate said light pipes and said source for directing the light from said source through said light pipes.

7. The system as defined by claim 1 wherein said light splitter means comprises:
   (a) an annular shaped body defined by top and bottom walls and inner and outer spaced sidewalls,
   (b) means retaining said light pipes transverse to, and extending through, respective spaced segments of said outer sidewall,
   (c) a plurality of lenses respectively disposed within spaced segments of said inner sidewall and respectively focused upon the ends of said light pipes,
   (d) pyramid shaped reflector means having adjacently disposed sloping reflector walls for respectively reflecting light impinging thereupon toward said plurality of lenses, and
   (e) means extending through said top wall for focusing light from said source upon said reflector means.

8. The system as defined by claim 1 wherein each of said light fixture means comprises:
   (a) an annular shaped body defined by top and bottom walls and inner and outer spaced sidewalls,
   (b) a plurality of light cones secured with, and having their axes transverse to, respective spaced segments of said outer sidewall, each of said light cones having an outer reflective surface effective to reflect light received thereby essentially 360° around such outer surface, (c) a plurality of lenses respectively disposed within spaced segments of said inner sidewall and respectively focused upon the apex of each cone, (d) pyramid shaped reflector means having adjacently disposed sloping reflector walls for respectively reflecting light impinging thereupon toward said plurality of lenses, and (e) means extending through said top wall for focusing light upon said reflector means.

9. The system as defined by claim 1 wherein each of said optical switches comprises:

(a) a disc disposed between aligned segments of the light pipe extending between said light splitter means and said light fixture, (b) said disc having an opaque portion for preventing the passage of light therethrough and at least one transparent portion for enabling light to pass therethrough, and (c) means rotating said disc to position said opaque and transparent portions between said aligned segments.

10. The system as defined by claim 9 wherein the disc of said optical switch comprises a plurality of transparent portions of different color properties.

11. The system as defined by claim 9 wherein said at least one transparent portion of said disc is of varying degrees of transparency.

* * * * *